(12) United States Patent
Anderson et al.

(10) Patent No.: US 7,488,767 B1
(45) Date of Patent: Feb. 10, 2009

(54) PIGMENT DISPERSANT SYSTEM AND METHOD FOR PIGMENT GRINDING

(75) Inventors: Bruce J. Anderson, Jamestown, PA (US); Paul Bluman, Canton, OH (US); Curt Braden, N. Canton, OH (US)

(73) Assignee: ABB Technical Coatings, Ltd, N. Canton, OH (US)

( * ) Notice: Subject to any disclaimer, the term of this patent is extended or adjusted under 35 U.S.C. 154(b) by 615 days.

(21) Appl. No.: 10/738,493

(22) Filed: Dec. 17, 2003

(51) Int. Cl.
*C08K 5/10* (2006.01)

(52) U.S. Cl. .................... 524/186; 524/315; 524/428

(58) Field of Classification Search ............... 524/428, 524/315, 186
See application file for complete search history.

(56) References Cited

U.S. PATENT DOCUMENTS

| | | | |
|---|---|---|---|
| 4,317,682 A | 3/1982 | Katsura et al. | |
| 4,334,932 A | 6/1982 | Roueche | |
| 4,859,247 A | 8/1989 | Foye et al. | |
| 4,909,852 A | 3/1990 | Atkinson | |
| 5,071,483 A | 12/1991 | Dietz et al. | |
| 5,207,829 A | 5/1993 | Schwab et al. | |
| 5,264,032 A | 11/1993 | Dietz et al. | |
| 5,318,627 A | 6/1994 | Dietz et al. | |
| 5,320,672 A * | 6/1994 | Whalen-Shaw | 106/287.24 |
| 5,476,544 A | 12/1995 | Endo et al. | |
| 6,599,353 B2 * | 7/2003 | Spencer et al. | 106/31.6 |

* cited by examiner

*Primary Examiner*—Edward J Cain
(74) *Attorney, Agent, or Firm*—Roger D. Emerson; Daniel A. Thomson; Emerson, Thomson & Bennett, LLC (57) ABSTRACT

A new and improved method for making a pigment dispersant system, a method for pigment grinding and a new pigment dispersant system are herein disclosed. The inventive compound and process do not use a resin or the harsh milling process used in current pigment technologies.

24 Claims, 7 Drawing Sheets manufactured agglomerates dispersed aggregates

FIGURE 1

FIGURE 2 wetting (physical energy)

Stabilizing (chemical energy)

Shear (mechanical energy)

W/R Primer

Exchange Reaction →

Dissociation Complex Acid →

Reaction Substrate →

FIGURE 7

PIGMENT DISPERSANT SYSTEM AND METHOD FOR PIGMENT GRINDING

I. BACKGROUND OF THE INVENTION

A. Field of the Invention

This invention relates to the art of pigment dispersion, and more particularly to high-speed pigment dispersion, and even more particularly to high-speed pigment dispersion without the use of a resin or milling equipment.

B. Description of the Related Art

The batch manufacture of paint products has invariably been restricted by the ability to disperse or grind pigment into a usable state and consistency before finishing the batch with the remaining ingredients or letdown.

The present standard method of pigment dispersion is accomplished in one of the following methods.

1. Mill Dispersion:
   The types of milling methods are varied. The typical methods involve combining a pigment with resins and surfactants in a paste form and subjecting the "paste" to the milling process. The milling apparatus generally subjects the paste to mechanical grinding by passing it through grinding media of some sort.

2. High Speed Dispersion:
   This method utilizes the same resin/pigment paste as the milling dispersion method described above. The primary difference is the use of high speed mixing equipment as a method of separating pigment particles to achieve final grind specifications. The pigments that can disperse in this method are very limited for color. Deep rich color tones are rarely achieved.

3. Base Intermix Tinting:
   Base intermixing involves the mixing of clear "non-pigment" components of a paint formula with pre-dispersed pigments that are purchased or manufactured on site. The resultant product is simpler to make on a per batch basis, but tends to be expensive and is frequently subject to specification variation dependant on the type and quantity of colorant used. An additional drawback in this method of making paint is the addition of the binder and additives that are present in the shading paste inherently detract from the product end performance by dilution of the tint base properties.

The common drawback to all the above is the work involved in the milling or dispersion process. The resins and additives that are utilized in order to mill the pigments are not universally compatible. This results in shading pastes to be purchased in from outside sources. These pastes are expensive and consequently prohibitive economically.

The second drawback to grinding pigments is the batch size restrictions. In order to have an "effective" grind, the batch must be sized to the mill (or tank in the case of hi-speed dispersion). This restricts the paint manufacturer to the batch sizes based on equipment efficiency. Operations must continuously juggle batches as well as equipment based on the ever-changing needs of customers.

Small batch production is non-productive and cost prohibitive because it is labor intensive. It has become such a volatile issue that many gallons and dollars worth of business are passed by each day because of the lack of effective small batch processing.

Figure 1:
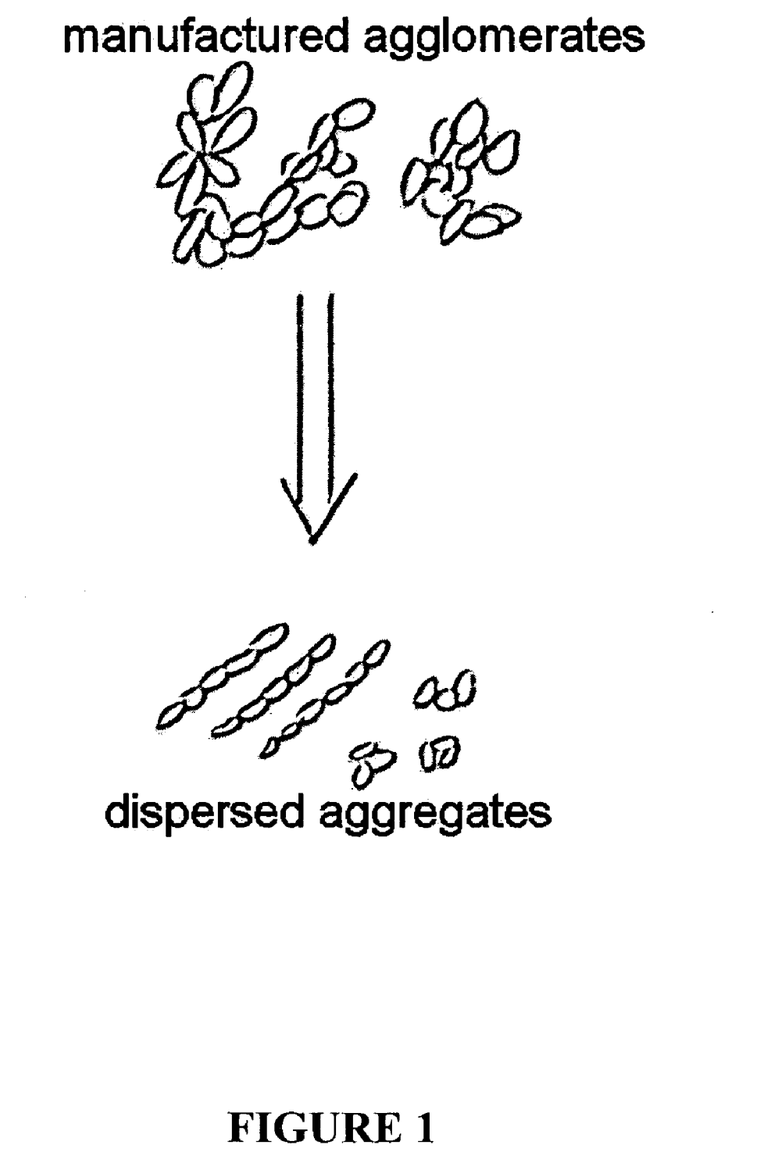
FIG. 1 is a pictorial representation of the prior art dispersion of pigments.
Figure 2:
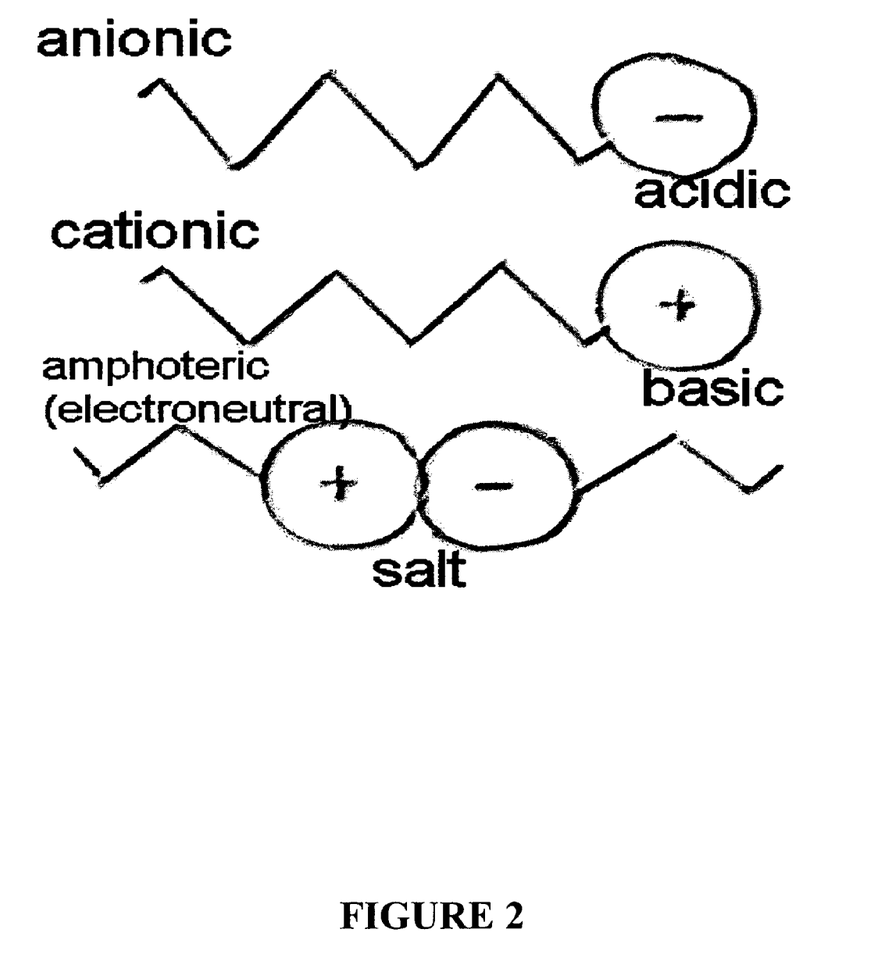
FIG. 2 is a pictorial representation of the wetting agents.
Figure 3:
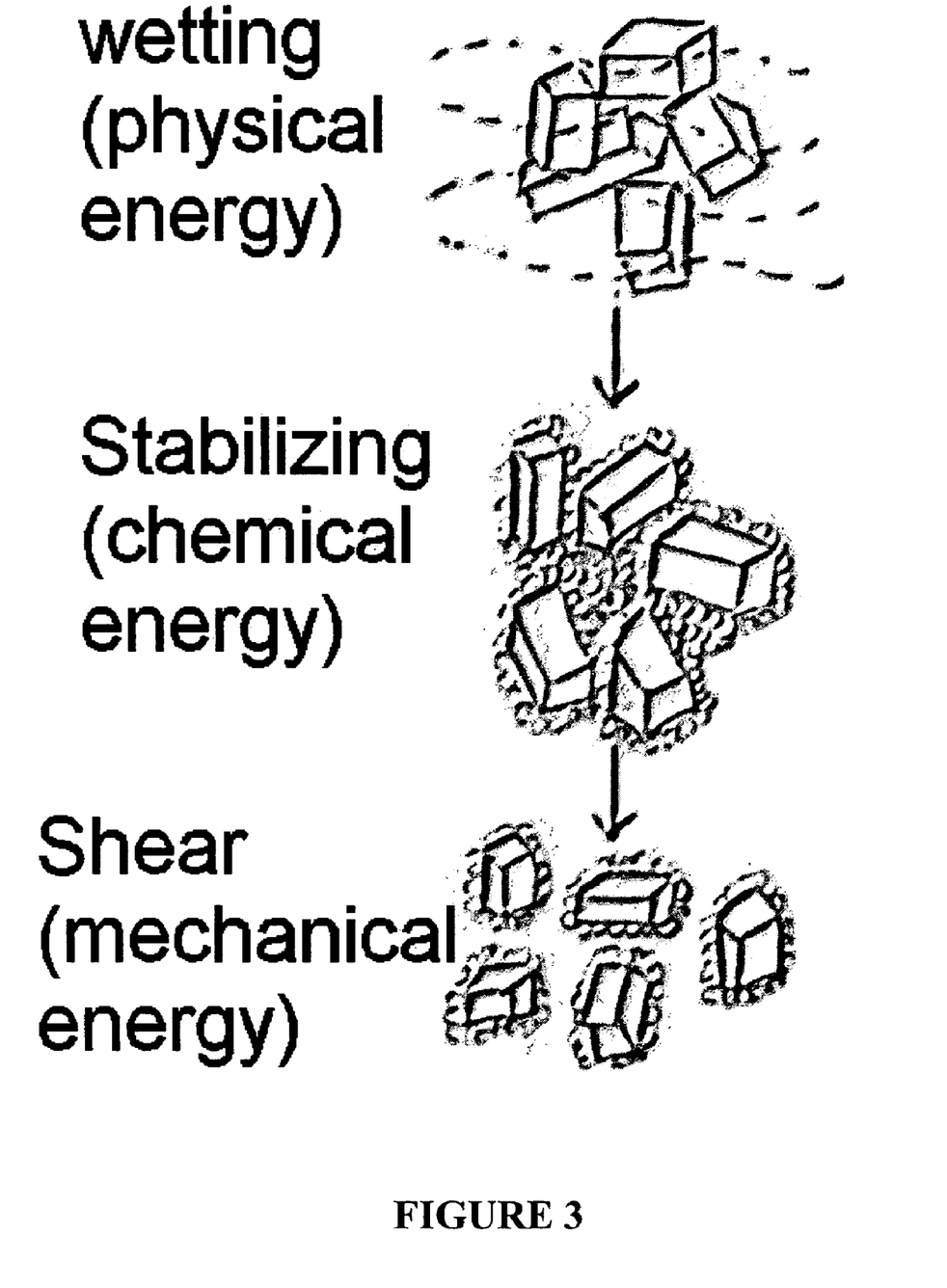
FIG. 3 is a pictorial representation of the prior art process.
Figure 4:
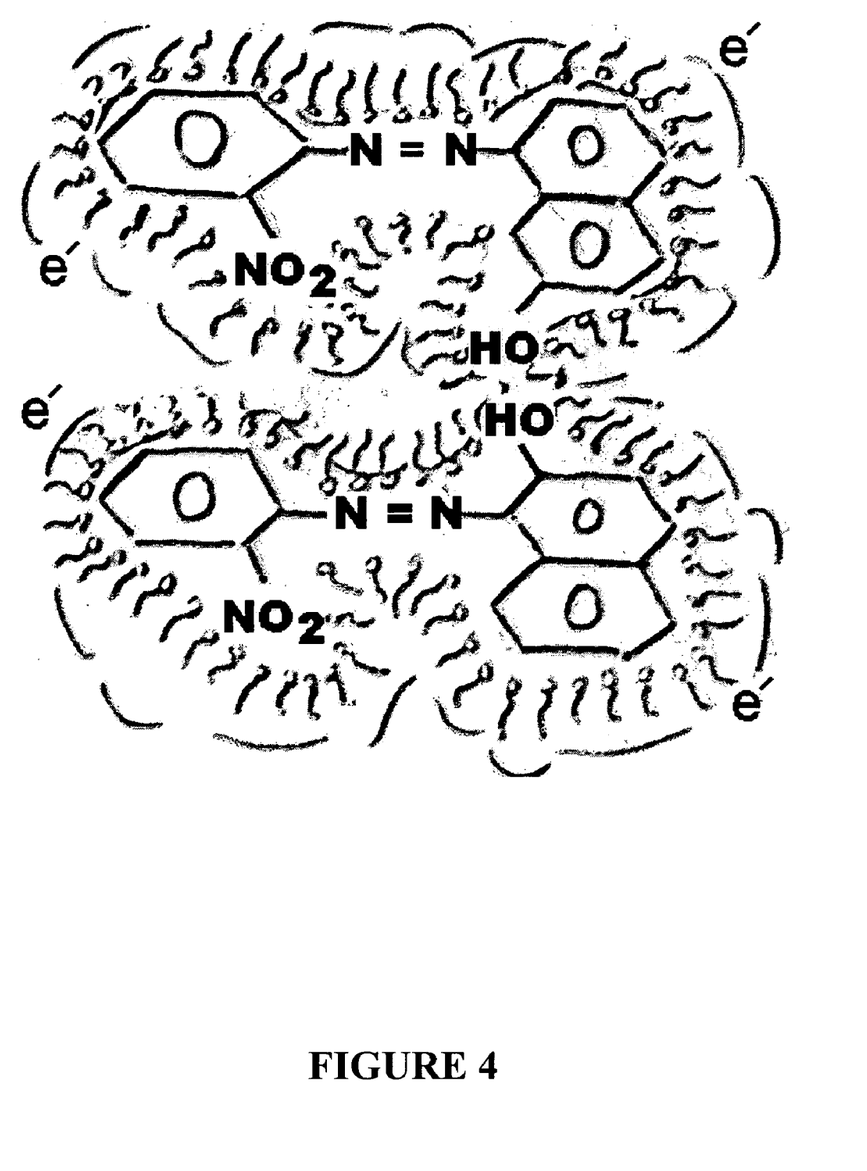
FIG. 4 is a pictorial representation of ionic anchoring in the present invention.
Figure 5:
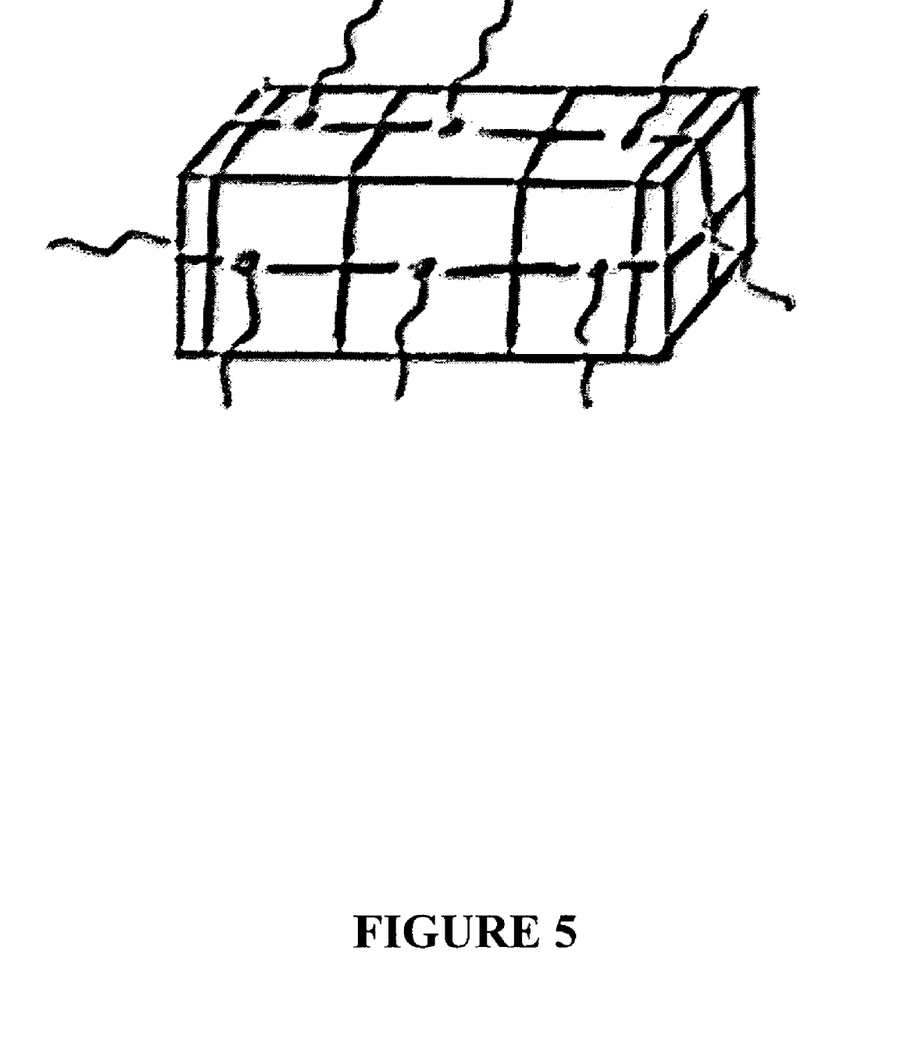
FIG. 5 is a pictorial representation of an anchored bridging network.
Figure 6:
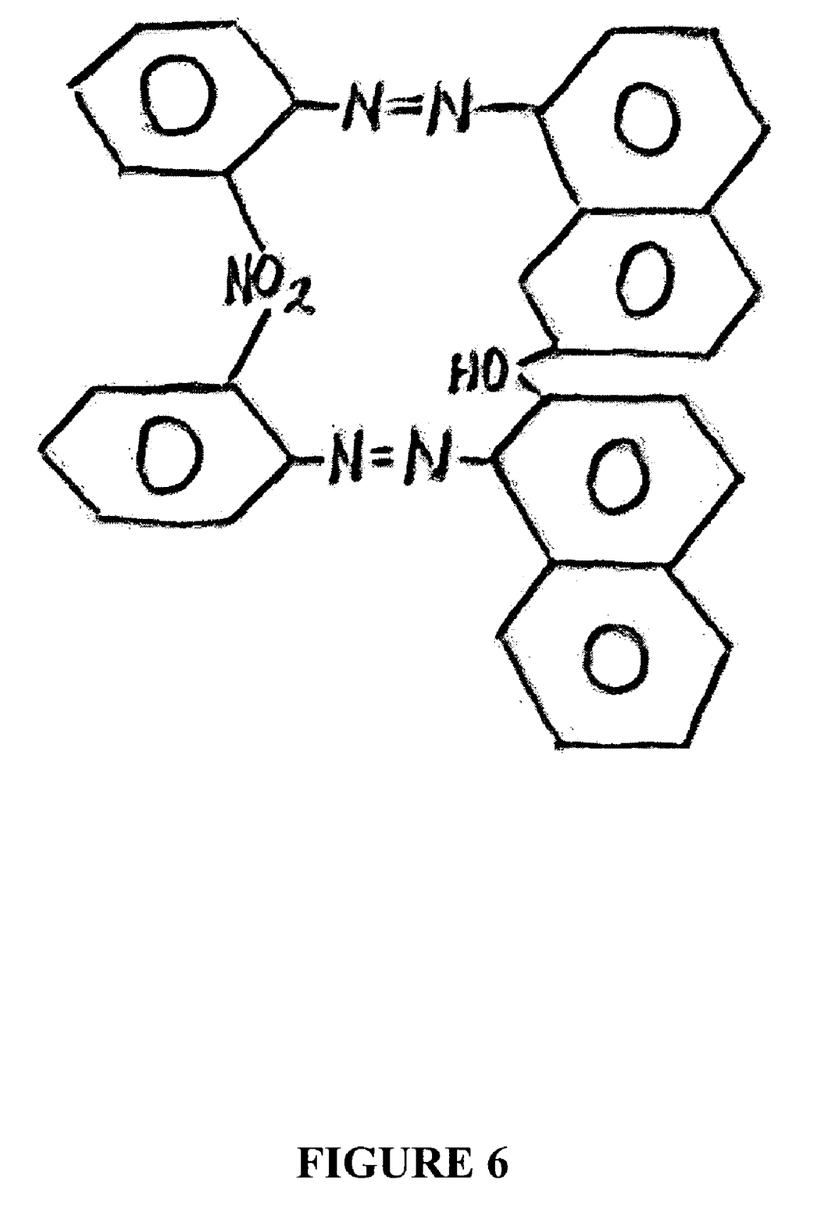
FIG. 6 is a pigment aggregate.
Figure 7:
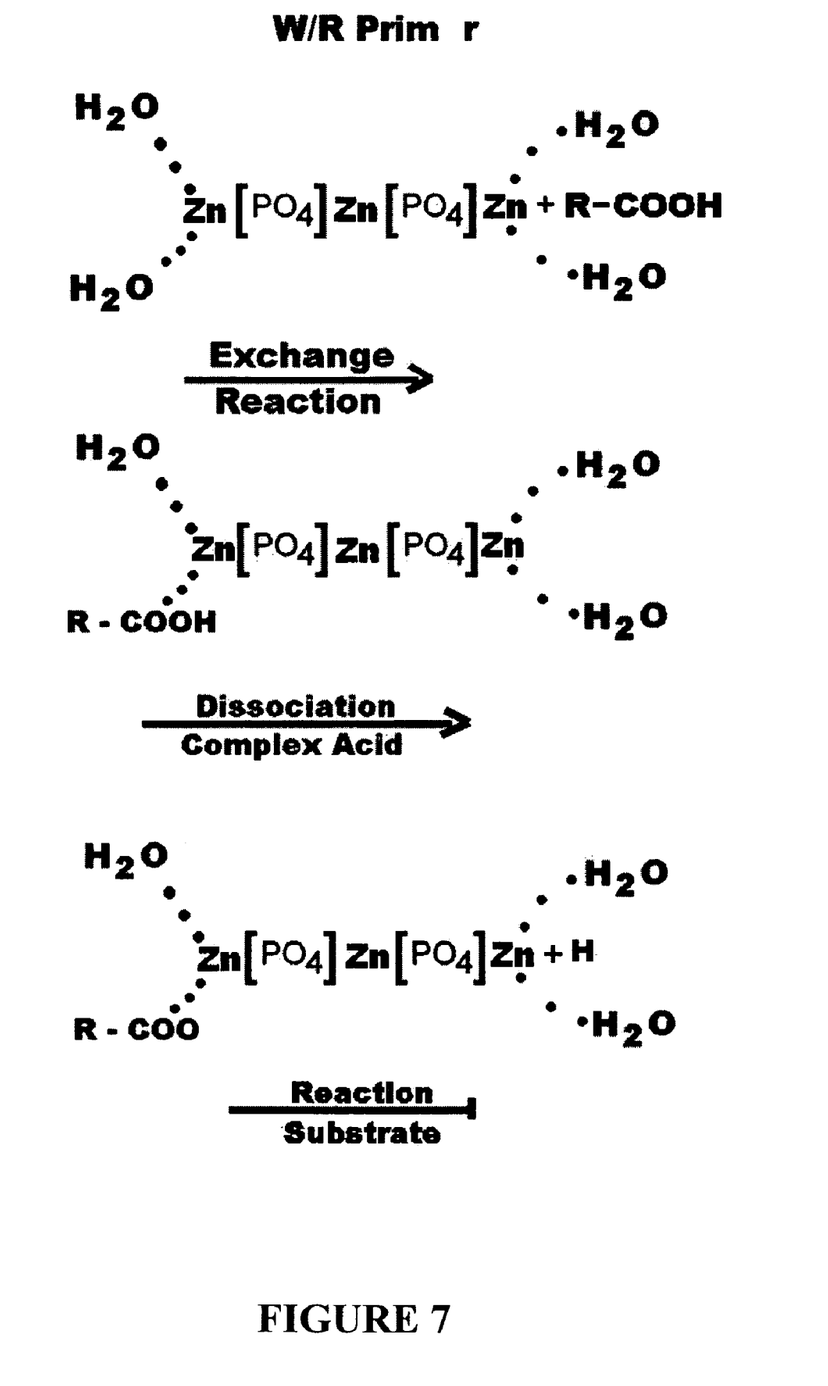
FIG. 7 is a pictorial representation of the inventive process.

With reference now to FIGS. 1-3, the manufacture process of pigments results in agglomerates of the pigment by hydrophilic aggregation due to the drying process. To maximize the properties of the pigments, these aggregates have to be further dispersed in the coating manufacturing process to yield desired color strength, opacity, and specular 60%-20% gloss ranges. To achieve this by conventional methods, a resin disperses the pigments to interstitially coat the agglomerates; further, a wetting agent is introduced to wet out the pigment particles composing the aggregates. Finally, through some form of mechanical high shear milling equipment, the pigment aggregate sizes are reduced, creating an increased surface area of the pigment particles. This allows the wetting agent to adsorb onto the surface, blocking reagglomeration.

The classifications of wetting or dispersing agents are primarily categorized into the following three groups in response to charging pigment particles: 1) An anionic acidic wetter is used in compounding pigment with negative charge; 2) A cationic, which is more basic; and 3) an amphoteric resultant salt. Non-ionic dispersants, due to being mechanically basic wetters, will not be discussed.

Conventional milling of a polymer (resin), along with a solvent carrier is required to physically wet out the surface areas of the pigment. Secondly, a dispersant is used to chemically break up Van der Waals force's interaction between the pigment particles in the aggregate accretions. Finally, mechanically, milling equipment is used for high shear and impact to reduce the aggregate sizes. This creates a cost in the milling process due to the loss of grind paste remaining in the mill during transfer. Additionally, to clean for the next production batch, additional solvent and/or resin are used to flush the milling equipment clean.

During formulation for conventional milling it is important to utilize, pigment volume concentration (PVC) & PVC vs. critical pigment volume concentration (CPVC). PVC is the percent pigment by volume correlated to the percent resin by volume. Various pigments, due to chemical and physical properties, have ideal PVC's in a particular resin that must be derived mathematically. CPVC is the PVC point at which the volume of nonvolatile resin portion is maximized to completely coat the pigment surfaces and fill the void spaces between pigment particles. The formula for calculated PVC is $PVC=P/(P+V)$, where P is volume of pigment and V is volume of vehicle. CPVC is calculated by $CPVC=[(P/(P+x+y)]\times 100$, where P is volume of pigment, x is volume of adsorbed vehicle, y is volume of void spaces, and V is volume of vehicle.

The present invention provides a new and improved pigment dispersion system and process that does not use resin or milling equipment, and overcomes certain difficulties inherent in the related inventions while providing better overall results.

II. SUMMARY OF THE INVENTION

The processing method is not resin associated. Pigments are dispersed in water or solvent. Compatibility with water based or solvent based systems is not an issue.

Mill time is minimized. Most of the pigments tested are dispersed without the need for any additional processing. In the rare case that the grind is not met with the dispersion method, the water or solvent/pigment mixture can be run through a conventional mill. The incidence of this additional milling is rare but when it is necessary, the clean up and mill time are greatly minimized because of the resin free aspect of the paste. Mill cleanup is done with water and/or solvent. The pigments tested range from extenders and corrosion inhibitors to rich deep reds and blues.

The resultant paste has an extraordinary shelf life and can be used universally in all water reducible or solvent reducible products dependant on the manufacturer's choice.

The formulators, as well as production managers no longer need to be tied to mill availability in creating a batch. Batch sizes can be made effectively and economically without scheduled milling time. The standard lead-time for premixing, milling, and cooling before letdown is eliminated. Tank cleanup is minimized because there is no need for a premix tank.

The pigmented paste is manufactured at the convenience of the production manager without the tie up or possible contamination of a mill.

The resultant coatings are identical to the conventional milled products because they have not been altered or diluted with the surfactants, resins, and additives that generally accompany the pigments in conventional shading paste.

The production costs are decreased by faster throughput, less cleanup, and lower raw material costs. Additional gallons produced that would otherwise be purchased through an outside source can recognize further economic savings.

Additional income can be recognized from the sale of the paste as a raw material to OEM manufacturers and other paint producers.

The resulting pigmented paste can be formulated to be VOC Free, Glycol Free, and HAPS free at the choosing of the manufacturer.

The colors that are created from the inventive system are more intense because of the exceptional grind dispersion. This strength efficiency allows the formulator to minimize the quantities of total pigment used.

The shading that is done at the end of production is accomplished with the true pigmentation of the formula. Quality control technicians can shade more efficiently without introducing tints that are foreign to the formula.

In accordance with one aspect of the present invention, a pigment dispersant system includes water, a polymeric pigment dispersant (without the use of a binder), a primary amine, and a defoamer. A binder is a medium that the pigment is suspended in to be ground.

In accordance with one aspect of the present invention, the water is deionized water.

In accordance with one aspect of the present invention, the ammonium hydroxide is aqua ammonia 26% ammonium hydroxide.

In accordance with one aspect of the present invention, the defoamer is isobutyl isobutyrate.

In accordance with one aspect of the present invention, the polymeric pigment dispersant is a hyperdispersant.

In accordance with one aspect of the present invention, the polymeric pigment dispersant is chosen from the group comprising: an approximately 90% active polymeric dispersant, an approximately 100% active polymeric dispersant, an approximately 50% active polymeric dispersant, and an approximately 40% active polymeric dispersant.

In accordance with one aspect of the present invention, the dispersant system further comprises an active synergist agent.

In accordance with another aspect of the present invention, a solvent-based pigment dispersant system includes a hydrocarbon solvent, a polymeric pigment dispersant (without the use of a binder), and a solvent compatible amine.

In accordance with another aspect of the present invention, the solvent is chosen from the group comprising: acetates, ketones, and aromatics.

In accordance with another aspect of the present invention, the solvent is n-butyl acetate.

In accordance with another aspect of the present invention, the solvent compatible amine is diethylamine.

In accordance with another aspect of the present invention, a method for making a pigment dispersant system includes the steps of, in order, mixing 55.982% by weight deionized water, 0.372% by weight isobutyl isobutyrate, and 2.896% by weight of a polymeric pigment dispersant (without the use of a binder), adding into a constant vortex 22.683% by weight of a low surface area carbon black and 17.376% by weight kaolin clay, adding 0.691% by weight aqua ammonium 26% ammonium hydroxide, mixing in a high-speed mixing system all of the above components, and rinsing with deionized water and ammonium hydroxide.

In accordance with another aspect of the present invention, a method for making a pigment dispersant system includes the steps of mixing water, a defoamer, and a polymeric pigment dispersant (without the use of a binder), adding to a vortex carbon black and a rheology modifier, adding a primary amine, mixing in a high-speed mixing system all of the above components, and rinsing with water and a primary amine.

In accordance with another aspect of the present invention, the water is deionized water, the defoamer is isobutyl isobutyrate, and the polymeric pigment dispersant is chosen from the group comprising: an approximately 90% active polymeric dispersant, an approximately 100% active polymeric dispersant, an approximately 50% active polymeric dispersant, and an approximately 40% active polymeric dispersant.

In accordance with another aspect of the present invention, the carbon black is a low surface area carbon black and the rheology modifier is a pigmented kaolin clay.

In accordance with another aspect of the present invention, the ammonium hydroxide is aqua ammonium 26% ammonium hydroxide.

In accordance with another aspect of the present invention, the water, defoamer, pigment dispersant, carbon black, kaolin clay, and ammonium hydroxide are added in synergistically effective amounts.

In accordance with another aspect of the present invention, mixing in a tank and cowles blade high-speed mixing system all of the above components at a speed capable of overcoming the Van der Waals force.

In accordance with another aspect of the present invention, mixing in a tank and cowles blade high-speed mixing system all of the above components at between approximately 3500 to approximately 4000 rpm.

Still other benefits and advantages of the invention will become apparent to those skilled in the art upon a reading and understanding of the following detailed specification.

Unless otherwise indicated, all numbers expressing quantities of ingredients, reaction conditions, and so forth used in the specification and claims are to be understood as being modified in all instances by the term "approximately." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

III. BRIEF DESCRIPTION OF THE DRAWINGS

The invention may take physical form in certain parts and arrangement of parts, at least one embodiment of which will be described in detail in this specification and illustrated in the accompanying drawings which form a part hereof and herein.

IV. DESCRIPTION OF THE INVENTION

With reference now to FIGS. 4-7, the inventive dispersant is composed of molecules with ionic anchoring mechanisms, which have hydrophilic and hydrophobic tails. The molecules orientate themselves to exert the least amount of expended energy in bonding. Because of this orientation in the outermost electron (e) cloud, pigment particles cannot curl upon each other any longer. This is the site where the molecules in solute (solvent or water) anchor themselves adsorbing onto the exposed pigment surface area. The tail (5-10 nm long), with a greater square of distance than the pigment particle to pigment particle, is able to overcome Van der Waals force, thusly breaking up the pigment agglomerates. This pigment particle loss of entropic freedom acts as a repellant as the inventive dispersant molecules hinder the approach of reactant pigment molecules to each other. This effect is the promotion of close steric hindrance, which supports further single anchoring chain adherence through adsorption. This stabilizing chain of events forms a backbone of dispersant anchor and tail sites that not only break pigment particles apart but also keep them apart. Augmenting this rate of site attachment reaction is further accelerated by actual absorption into the pigment particles by a sequestering effect.

A resultant effect is the lowering in viscosity and extended terminated stabilization of the grind solution. The limiting viscosity of the inventive pigment dispersant system solution may be expressed logarithmically as observed in reactive diluent solutes. The straight-chained anchor/tail groups support long term stability as having no surfactant interplay and bridges pigment/resin complexes from anchor to anchor.

Other conventional dispersants do have anchoring groups on an ionic level, but only work through adsorption in which their accommodated surfactants or the surface treatment of many pigments during manufacturing, can cause instability in situ or after application in the cured film by setting up sites for hydrolysis. By absorption into the pigment, the present invention is permanently incorporated as part of the pigment without impingement to the final cured film's performance. It does not affect interfacing between the laminar film formation onto the substrate, promoting dissociation of the film and reaction to the metal substrate. It also allows an interstitial relationship between the resin and the pigment.

In one embodiment of this invention, the inventive grinding method, due to unique chemistry, requires only a high speed mixing system (a tank & cowles blade). In this embodiment, the efficiency of the dispersant is achieved with a cylindrical tank that is 2.5 to 3.5 times the impeller (blade) diameter. In this particular embodiment, the high-speed cavitation mix for a 12" cowles blade would be a 15 h.p. motor [H.P.=0.1 $d^2$ (d=impeller diameter): $0.1 \times 144 \sim 14.4$ H.P.], with the impeller positioned at ⅓ of the charge depth at a peripheral speed of 5000 fpm or approximately 3500—approximately 4000 rpm. It is to be understood, however, that any high-speed mixer can be used, as long as chosen using sound engineering judgment. It is also to be understood that the speed of the mixer can be any speed as long as the speed is fast enough to overcome the Van der Waals force, thus breaking up the pigment agglomerates.

Based on a pigment's surface area, the inventive chemistry has been pre-calculated to determine the amount to be incorporated as an expressed dosage into a particular pigment mix. In an instance of underdosage, full benefits will not be realized and too high of a dosage will cause an overcrowding on the pigment surface with limited long-term performance and layering collapses.

In this embodiment, the process requires approximately 15 to 20 minutes of mixing, and the only equipment needed is a tank and a high-speed mixer. If the pigments are pre-ground and utilized as a paste, the processing can be done with a low speed mixer.

The pigment is dispersed in deionized water, utilizing approximately 1300 to approximately 2300 rpm under a high-speed dispersion mixer. Once the grind is achieved, a rinse is incorporated into the final formulation to flush the grinding tank during filling. This non-resinous process allows the mill to run efficiently at high pump settings. The lack of resin in the pigment equates to fast and efficient clean up of the mill allowing for shorter turnaround of equipment. The finished grind paste is very stable, having a shelf life, under ambient conditions, in excess of twelve months. Stability tests of 105° F. showed no adverse effects after six months. The dispersed pastes exhibit no separation or settling due to the homogenous rheology of the dispersion.

In one embodiment of this invention, a pigment dispersant system is made by premixing a polymeric pigment dispersant with ammonium hydroxide in synergistically effective amounts. After premixing, water is added in a synergistically effective amount, then a defoamer is added in a synergistically effective amount. In another embodiment of this invention, a synergist agent is added as well.

EXAMPLE 1

In this example, an organic dispersant is made by premixing 26.465 lbs. (2.915 gallons) of a 90% active polymeric dispersant in water (an example is Solsperse® 41090, available from Avecia, Inc. of Wilmington, Del.) with 1.950 lbs. (0.261 gallons) of aqua ammonia 26% ammonium hydroxide. Once premixed, then add 802.298 lbs. (96.34 gallons) of deionized water, then finish by adding 3.621 lbs. (0.510 gallons) of isobutyl isobutyrate. The dispersant has 2.8548% weight solids, 2.5969% volume solids, 0.43% non-exempt volatiles by weight, and weighs 8.34 lbs. per gallon.

EXAMPLE 2

In this example, an organic dispersant is made by mixing 689.763 lbs. (82.805 gallons) of deionized water, 109.769 lbs. (11.653 gallons) of a 100% active polymeric dispersant in water (an example is Solsperse® 27000, available from Avecia, Inc. of Wilmington, Del.), 26.576 lbs. (1.911 gallons) of a pigment synergist agent (an example is Solsperse® 12000 available from Avecia) and 20.567 lbs. (2.753 gallons) of aqua ammonia 26% ammonium hydroxide. Once the preceding is mixed, then add 6.239 lbs. (0.879 gallons) of isobutyl isobutyrate. The dispersant has 15.9857% weight solids, 13.5633% volume solids, 0.73% non-exempt volatiles by weight, and weighs 8.53 lbs. per gallon.

EXAMPLE 3

In this example, an organic dispersant is made by mixing 543.650 lbs. (65.264 gallons) of deionized water, 281.810 lbs. (33.509 gallons) of a 50% active polymeric dispersant in water (an example is Solsperse® 44000, available from Avecia, Inc. of Wilmington, Del.), and 3.328 lbs. (0.446 gallons) of aqua ammonia 26% ammonium hydroxide. Once the preceding is mixed, then add 5.547 lbs. (0.781 gallons) of isobutyl isobutyrate. The dispersant has 16.8883% weight solids, 16.5869% volume solids, 0.66% non-exempt volatiles by weight, and weighs 8.34 lbs. per gallon.

EXAMPLE 4

In this example, an inorganic dispersant is made by pre-mixing 4.750 lbs. (0.523 gallons) of a 90% active polymeric dispersant in water (an example is Solsperse® 41090, available from Avecia, Inc. of Wilmington, Del.) with 0.350 lbs. (0.047 gallons) of aqua ammonia 26% ammonium hydroxide. Once premixed, then add 144.000 lbs. (17.287 gallons) of deionized water, then finish by adding 0.650 lbs. (0.092 gallons) of isobutyl isobutyrate. The dispersant has 2.8548% weight solids, 2.5969% volume solids, 0.43% non-exempt volatiles by weight, and weighs 8.34 lbs. per gallon.

EXAMPLE 5

In this example, a solvent-based organic dispersant is made by mixing 645.753 lbs. (88.459 gallons) of n-butyl acetate, 79.102 lbs. (9.496 gallons) of a 40% active polymeric dispersant in a solvent (an example is Solsperse® 38500, available from Avecia, Inc. of Wilmington, Del.), 19.715 lbs. (1.879 gallons) of a 100% active pigment synergist agent (an example is Solsperse® 5000 available from Avecia) and 0.974 lbs. (0.165 gallons) of diethylamine. The dispersant has 6.8883% weight solids, 5.5068% volume solids, 93.11% non-exempt volatiles by weight, and weighs 7.46 lbs. per gallon.

EXAMPLE 6

In this example, a solvent-based organic dispersant is made by mixing 643.749 lbs. (88.459 gallons) of n-butyl acetate, 79.664 lbs. (9.563 gallons) of a 40% active polymeric dispersant in a solvent (an example is Solsperse® 38500, available from Avecia, Inc. of Wilmington, Del.), 19.312 lbs. (2.088 gallons) of a 100% active pigment synergist agent (an example is Solsperse® 22000 available from Avecia) and 0.966 lbs. (0.164 gallons) of diethylamine. The dispersant has 6.8816% weight solids, 5.7411% volume solids, 93.12% non-exempt volatiles by weight, and weighs 7.44 lbs. per gallon.

EXAMPLE 7

In this example, a solvent-based inorganic dispersant is made by mixing 649.502 lbs. (88.973 gallons) of n-butyl acetate, 90.281 lbs. (10.838 gallons) of a 40% active polymeric dispersant in a solvent (an example is Solsperse® 38500, available from Avecia, Inc. of Wilmington, Del.), and 1.113 lbs. (0.189 gallons) of diethylamine. The dispersant has 4.8741% weight solids, 4.1401% volume solids, 95.13% non-exempt volatiles by weight, and weighs 7.41 lbs. per gallon.

EXAMPLE 8

In this example, a green pigment dispersion is made by mixing 377.677 lbs. (45.339 gallons) of deionized water, 195.776 lbs. (23.279 gallons) of a 50% active polymeric dispersant in water (an example is Solsperse® 44000, available from Avecia, Inc. of Wilmington, Del.), and 2.312 lbs. (0.310 gallons) of aqua ammonia 26% ammonium hydroxide. Once the preceding is mixed, sift together 462.462 lbs. (24.417 gallons) of green pigment (an example is 264-0414 phthalo green) and 132.572 lbs. (6.112 gallons) of a rheology modifier slowly into a constant vortex. The rheology modifier is made by mixing 2008.275 lbs. (91.836 gallons) of kaolin clay (an example is Polygloss® available from J. M. Huber Corporation of Atlanta, Ga.) with 160.662 lbs. (8.164 gallons) of attapulgite clay (an example is Attagel® #50 available from Engelhard Corporation of Iselin, N.J.). The next step is to add 3.854 lbs. (0.543 gallons) of isobutyl isobutyrate. All of the above ingredients are then mixed in a high-speed cowles mixer. The dispersant has 58.9895% weight solids, 42.0524% volume solids, 0.33% non-exempt volatiles by weight, and weighs 11.75 lbs. per gallon.

EXAMPLE 9

In this example, a green pigment dispersion is made by mixing 375.081 lbs. (45.028 gallons) of deionized water, 194.430 lbs. (23.119 gallons) of a 50% active polymeric dispersant in water (an example is Solsperse®44000, available from Avecia, Inc. of Wilmington, Del.), and 2.296 lbs. (0.307 gallons) of aqua ammonia 26% ammonium hydroxide. Once the preceding is mixed, sift together 587.270 lbs. (31.007 gallons) of green pigment (an example is 264-0414 phthalo green) and 3.827 lbs. (0.539 gallons) of isobutyl isobutyrate. All of the above ingredients are then mixed in a high-speed cowles mixer. The dispersant has 58.8599% weight solids, 42.4507% volume solids, 0.33% non-exempt volatiles by weight, and weighs 11.63 lbs. per gallon.

It is to be understood in the above Examples, that the following ranges apply to the percent by weight of the following compounds: Solsperse 27000±5.0%, Solsperse 41090±5.0%, Solsperse 38500±5.0%, Solsperse 12000±5.0%, Solsperse 22000±5.0%, Solsperse 44000±5.0%, diethylamine±2.0%, ammonium hydroxide±2.0%, attapulgite clay±2.5%, kaolin clay±2.5%, phthalo green±5.0%, n-butyl acetate±5.0%, isobutyl isobutyrate±2.5%, deionized water±5.0%, and rheology modifier±2.0%.

It is to be understood that clay is not the only rheology modifier, and any rheology modifier may used as long as chosen using sound chemical and engineering judgment. Examples of some the clays that can be used in this invention are kaolin, attapulgite, bentonite, and montmorillonite. This list of clays is not intended to be exhaustive.

Once the inventive pigment dispersant system is made, the pigments can then be dispersed. In one embodiment of this invention, water-based inorganic pigments, such as whites, iron oxides, and anti-corrosives, can be dispersed by determining the proper amount of the inventive dispersant to be used, and then mixing the pigment with the dispersant. The amount of dispersant to be added is determined based upon the pigment's surface area. The proper amount of dispersant can also be calculated using pigment surface area for water-based organic pigments, such as black, blue, violet, green, red, maroon, magenta, and yellow, for solvent-based inorganic pigments, and for solvent-based organic pigments.

For water and solvent based tint series for both inorganic and organic pigments, both the proper amount of dispersant, as well as the proper amount of rheology modifier are calculated based upon the pigment's surface area. The following charts show one embodiment of the invention, wherein the amounts of pigment and/or rheology modifier are shown with respect to various types, and amounts, or pigments.

A basic 20 hour grinding process using the present invention begins with a dispersing pigment and additives being mixed, at high speed, in a pre-mix tank for approximately three hours. This pre-mix process provides adequate pigment dispersion to bypass the sand mill. Next, the resultant paste is combined with other additives in a letdown tank for approximately four hours. Then the paste is adjusted per a quality control process to meet specification. This part of the process is approximately eight hours. Next the paste is filtered and filled to order for approximately three hours. Finally, the letdown tank is cleaned for approximately two hours.

In contrast to the inventive process, the prior art grinding process begins with a dispersing pigment and additives being mixed, at high speed, in a pre-mix tank for approximately three hours. Next, the pre-mix tank is attached to a sand mill and the paste is processed through milling equipment for approximately eight hours. The sand mill is then cleaned for approximately one hour. The pre-mix tank is then cleaned for approximately one hour. Next, the resultant paste is combined with other additives in a letdown tank for approximately four hours. Then the paste is adjusted per a quality control process to meet specification. This part of the process is approximately four hours. Next the paste is filtered and filled to order for approximately two hours. Finally, the letdown tank is cleaned for approximately two hours.

TABLE 1

650 Water Based Tint Series

| A | B % Column A of Total Mix | C Pig. Wt. | D % Column F of Total Mix ± 5% | E Disp. Wt. | G % Column I of Total Mix | H Rheology Mod. Wt. | J Total Weight of Batch |
|---|---|---|---|---|---|---|---|
| Inorganic Pigments | | | | | | | |
| Whites Iron Oxides | 72.5% | 100.00 | 20.0% | 27.59 | 7.5% | 10.34 | 137.93 |
| Yellow | 50.0% | 100.00 | 45.0% | 90.00 | 5.0% | 10.00 | 200.00 |
| Reds/Browns | 55.0% | 100.00 | 35.0% | 63.64 | 10.0% | 18.18 | 181.82 |
| Blacks | 50.0% | 100.00 | 40.0% | 80.00 | 10.0% | 20.00 | 200.00 |
| Greens | 45.0% | 100.00 | 45.0% | 100.00 | 10.0% | 22.22 | 222.22 |
| Orange | 45.0% | 100.00 | 45.0% | 100.00 | 10.0% | 22.22 | 222.22 |
| Anti Corrosives | 80.0% | 100.00 | 20.0% | 25.00 | 0.0% | 0.00 | 125.00 |
| Organic Pigments | | | | | | | |
| Black | 30.5% | 100.00 | 62.5% | 204.92 | 7.0% | 22.95 | 327.87 |
| Blue, Violet | 40.0% | 100.00 | 45.0% | 112.50 | 15.0% | 37.50 | 250.00 |
| Green | 39.5% | 100.00 | 49.5% | 125.32 | 11.0% | 27.85 | 253.16 |
| Red, Maroon, Magenta | 50.0% | 100.00 | 35.0% | 70.00 | 15.0% | 30.00 | 200.00 |
| Yellow | 30.0% | 100.00 | 55.0% | 183.33 | 15.0% | 50.00 | 333.33 |

TABLE 2

660 Solvent Based Tint Series

| A | B % Column A of Total Mix | C Pig. Wt. | D % Column F of Total Mix ± 5% | E Disp. Wt. | G % Column I of Total Mix | H Rheology Mod. Wt. | J Total Weight of Batch |
|---|---|---|---|---|---|---|---|
| Inorganic Pigments | | | | | | | |
| Whites Iron Oxides | 72.5% | 100.00 | 20% | 27.59 | 7.5% | 10.34 | 137.93 |
| Yellow | 50.0% | 100.00 | 45.0% | 90.00 | 5.0% | 10.00 | 200.00 |
| Reds/Browns | 55.0% | 100.00 | 35.0% | 63.64 | 10.0% | 18.18 | 181.82 |
| Blacks | 50.0% | 100.00 | 40.0% | 80.00 | 10.0% | 20.00 | 200.00 |
| Greens | 45.0% | 100.00 | 45.0% | 100.00 | 10.0% | 22.22 | 222.22 |

TABLE 2-continued

660 Solvent Based Tint Series

| A | B % Column A of Total Mix | C Pig. Wt. | D % Column F of Total Mix ± 5% | E Disp. Wt. | G % Column I of Total Mix | H Rheology Mod. Wt. | J Total Weight of Batch |
|---|---|---|---|---|---|---|---|
| Orange | 45.0% | 100.00 | 45.0% | 100.00 | 10.0% | 22.22 | 222.22 |
| Anti Corrosives | 80.0% | 100.00 | 20.0% | 25.00 | 0.0% | 0.00 | 125.00 |
| Organic Pigments | | | | | | | |
| Black | 33.0% | 100.00 | 60.0% | 181.82 | 7.0% | 21.21 | 303.03 |
| Blue, Violet | 35.0% | 100.00 | 50.0% | 142.86 | 15.0% | 42.86 | 285.71 |
| Green | 42.0% | 100.00 | 50.0% | 119.05 | 8.0% | 19.05 | 238.10 |
| Red, Maroon, Magenta | 45.0% | 100.00 | 40.0% | 88.89 | 15.0% | 33.33 | 222.22 |
| Yellow | 35.0% | 100.00 | 50.0% | 142.86 | 15.0% | 42.86 | 285.71 |

TABLE 3

| A | B % Column A of Total Mix | C Pig. Wt. | D % Column G of Total Mix ± 5% | E Disp. Wt. | F Total Weight of Batch |
|---|---|---|---|---|---|
| Inorganic Pigments | | | | | |
| Whites | 85% | 100.00 | 15% | 17.65 | 117.65 |
| Iron Oxides | | | | | |
| Yellow | 60% | 100.00 | 40% | 66.67 | 166.67 |
| Reds/Browns | 75% | 100.00 | 25% | 33.33 | 133.33 |
| Blacks | 70% | 100.00 | 30% | 42.86 | 142.86 |
| Greens | 65% | 100.00 | 35% | 53.85 | 153.85 |
| Orange | 55% | 100.00 | 45% | 81.82 | 181.82 |
| Anti Corrosives | 80% | 100.00 | 20% | 25.00 | 125.00 |
| Organic Pigments | | | | | |
| Black | 40% | 100.00 | 60% | 150.00 | 250.00 |
| Blue, Violet | 50% | 100.00 | 50% | 100.00 | 200.00 |
| Green | 51% | 100.00 | 49% | 96.08 | 196.08 |
| Red, Maroon, Magenta | 60% | 100.00 | 40% | 66.67 | 166.67 |
| Yellow | 50% | 100.00 | 50% | 100.00 | 200.00 |

TABLE 4

| 560 Solvent Based Series A | B % Column A of Total Mix | C Pig. Wt. | D % Column G of Total Mix ± 5% | E Disp. Wt. | F Total Weight of Batch |
|---|---|---|---|---|---|
| Inorganic Pigments | | | | | |
| Whites | 90% | 100.00 | 10% | 11.11 | 111.11 |
| Iron Oxides | | | | | |
| Yellow | 60% | 100.00 | 40% | 66.67 | 166.67 |
| Reds/Browns | 75% | 100.00 | 25% | 33.33 | 133.33 |
| Blacks | 70% | 100.00 | 30% | 42.86 | 142.86 |
| Greens | 65% | 100.00 | 35% | 53.85 | 153.85 |
| Orange | 55% | 100.00 | 45% | 81.82 | 181.82 |
| Anti Corrosives | 80% | 100.00 | 20% | 25.00 | 125.00 |
| Organic Pigments | | | | | |
| Black | 40% | 100.00 | 60% | 150.00 | 250.00 |
| Blue, Violet | 50% | 100.00 | 50% | 100.00 | 200.00 |
| Green | 50% | 100.00 | 50% | 100.00 | 200.00 |
| Red, Maroon, Magenta | 60% | 100.00 | 40% | 66.67 | 166.67 |
| Yellow | 50% | 100.00 | 50% | 100.00 | 200.00 |

The invention has been described with reference to several embodiments. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

What is claimed is:

1. A pigment dispersant system comprising:
   water;
   a polymeric pigment dispersant, the dispersant not having a binder;
   ammonium hydroxide; and,
   a defoamer.

2. The system of claim 1, wherein the water is deionized water.

3. The system of claim 1, wherein the ammonium hydroxide is aqua ammonia 26% ammonium hydroxide.

4. The system of claim 3, wherein the defoamer is isobutyl isobutyrate.

5. The system of claim 4, wherein the polymeric pigment dispersant is a hyperdispersant.

6. The system of claim 1, wherein the polymeric pigment dispersant is chosen from the group comprising: an approximately 90% active polymeric dispersant, an approximately 100% active polymeric dispersant, an approximately 50% active polymeric dispersant, and an approximately 40% active polymeric dispersant.

7. A solvent-based pigment dispersant system, the system comprising:
   a hydrocarbon solvent;
   a polymeric pigment dispersant, the dispersant not having a binder; and,
   a solvent compatible amine.

8. A solvent-based pigment dispersant system, the system comprising:
a solvent chosen from the group comprising: acetates, ketones, and aromatics;
a polymeric pigment dispersant, the dispersant not having a binder; and,
a solvent compatible amine.

9. The system of claim 8, wherein the solvent is n-butyl acetate.

10. The system of claim 7, wherein the polymeric pigment dispersant is chosen from the group comprising: an approximately 90% active polymeric dispersant, an approximately 100% active polymeric dispersant, an approximately 50% active polymeric dispersant, and an approximately 40% active polymeric dispersant.

11. The system of claim 10, wherein the solvent compatible amine is diethylamine.

12. A method for making a pigment dispersant system, the method comprising the steps of, in order:
mixing 55.982% by weight deionized water, 0.372% by weight isobutyl isobutyrate, and 2.896% by weight of a polymeric pigment dispersant, without a binder;
adding into a constant vortex 22.683% by weight of a low surface area carbon black and 17.376% by weight kaolin clay;
adding 0.691% by weight aqua ammonium 26% ammonium hydroxide;
mixing in a high-speed mixing system all of the above components; and,
rinsing with deionized water and ammonium hydroxide.

13. A method for making a pigment dispersant system, the method comprising the steps of:
mixing water, a defoamer, and a polymeric pigment dispersant, without a binder;
adding to a vortex carbon black and a rheology modifier;
adding a primary amine;
mixing in a high-speed mixing system all of the above components; and,
rinsing with water and a primary amine.

14. The method of claim 13, wherein the water is deionized water, the defoamer is isobutyl isobutyrate, and the polymeric pigment dispersant is chosen from the group comprising: an approximately 90% active polymeric dispersant, an approximately 100% active polymeric dispersant, an approximately 50% active polymeric dispersant, and an approximately 40% active polymeric dispersant.

15. The method of claim 14, wherein the carbon black is a low surface area carbon black and the rheology modifier is a pigmented kaolin clay.

16. A method for making a pigment dispersant system, the method comprising the steps of:
mixing water, a defoamer, and a polymeric pigment dispersant, without a binder;
adding to a vortex carbon black and a rheology modifier;
adding ammonium hydroxide;
mixing in a high-speed mixing system all of the above components; and,
rinsing with water and ammonium hydroxide.

17. The method of claim 16, wherein mixing in a high-speed mixing system all of the above components further comprises the step of:
mixing in a tank and cowles blade high-speed mixing system all of the above components at between approximately 3500 to approximately 4000 rpm.

18. A method for pigment grinding, the method comprising the steps of:
making a pigment dispersant system, the system being made by a method comprising:
mixing water, a defoamer, and a polymeric pigment dispersant, without a binder;
adding to a vortex carbon black and a rheology modifier;
adding a primary amine;
mixing in a high-speed mixing system all of the above components; and,
rinsing with water and ammonium hydroxide; and,
mixing a pigment with the pigment dispersant system, the pigment and pigment dispersant system being mixed in a high-speed mixer.

19. The method of claim 18, wherein mixing a pigment with the pigment dispersant system, the pigment and pigment dispersant system being mixed in a high-speed mixer further comprises the step of:
mixing a pigment with the pigment dispersant system, the pigment and pigment dispersant system being mixed in a high-speed mixer at a speed capable of overcoming the Van der Waals force.

20. The method of claim 19, wherein mixing a pigment with the pigment dispersant system, the pigment and pigment dispersant system being mixed in a high-speed mixer further comprises the step of:
mixing a pigment with the pigment dispersant system, the pigment and pigment dispersant system being mixed in a high-speed mixer at between approximately 1300 to approximately 2300 rpm.

21. The method of claim 16, wherein the dispersant comprises molecules with ionic anchoring mechanisms, the mechanisms having hydrophilic and hydrophobic tails, wherein the molecules orientate themselves to exert the least amount of expended energy in bonding, wherein the molecules adsorb onto a exposed pigment surface area.

22. The method of claim 21, wherein the tail, with a greater square of distance that pigment particle to pigment particle, is capable of overcoming Van der Waals force, thereby breaking pigment agglomerates.

23. The method of claim 16, wherein the ammonium hydroxide is aqua ammonium 26% ammonium hydroxide.

24. A method for pigment grinding, the method comprising the steps of:
making a pigment dispersant system, the system being made by a method comprising:
mixing water, a defoamer, and a polymeric pigment dispersant, without a binder;
adding to a vortex carbon black and a rheology modifier;
adding ammonium hydroxide;
mixing in a high-speed mixing system all of the above components; and,
rinsing with water and ammonium hydroxide; and,
mixing a pigment with the pigment dispersant system, the pigment and pigment dispersant system being mixed in a high-speed mixer.

* * * * *